(12) United States Patent
Shioya et al.

(10) Patent No.: US 6,729,177 B2
(45) Date of Patent: May 4, 2004

(54) METHOD AND APPARATUS FOR INSPECTING FOR AIRTIGHTNESS FAILURE

(75) Inventors: Hiroshi Shioya, Nagoya (JP); Atsushi Otani, Ama-gun (JP); Hiroaki Sasaki, Nagoya (JP); Yoshikatsu Sekiai, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/358,696

(22) Filed: Feb. 5, 2003

(65) Prior Publication Data

US 2003/0154768 A1 Aug. 21, 2003

(30) Foreign Application Priority Data

Feb. 20, 2002 (JP) ........................... 2002-042974

(51) Int. Cl.⁷ .............................................. G01M 3/04
(52) U.S. Cl. ....................................................... 73/40.7
(58) Field of Search ........................................... 73/40.7

(56) References Cited

U.S. PATENT DOCUMENTS 5,861,547 A    1/1999   Kawai et al. ................ 73/49.2

FOREIGN PATENT DOCUMENTS

JP    10-111209      4/1998
JP    2001-228045    8/2001

*Primary Examiner*—Daniel S. Larkin
(74) *Attorney, Agent, or Firm*—Harness, Dickey & Pierce, PLC

(57) ABSTRACT

An airtightness failure inspection method according to the present invention comprises an initial step of generating an independent constant flow of gas in the interior of a cover 11 formed in such a manner as to surround an inspecting area of an inspection object and a detector 17, a pre-inspection step of sealing a tracer gas in the interior of the inspection object under pressure and placing the cover over the inspecting area, a measuring step of introducing a gas containing the tracer gas that has leaked from the inspecting area and which is drawn out of the cover into the detector for measuring the amount of the leak and a cleaning step of cleaning up flow paths constituting the flow path systems and instruments including the detector after the measurement is completed.

5 Claims, 4 Drawing Sheets

METHOD AND APPARATUS FOR INSPECTING FOR AIRTIGHTNESS FAILURE

BACKGROUND OF THE INVENTION

1. Field of the Invention

The present invention relates to a method and apparatus for inspecting an inspection object for airtightness failure using a leak inspecting medium (tracer gas) such as helium gas.

2. Description of the Related Art

As one of prior art inspection methods used for detecting a minute airtightness failure of an inspection object, there exists an inspection method using a helium leak detector (a helium leak detecting device) for detecting an amount of tracer gas leaking from the inspection object. In this type of inspection method, there are two methods, as shown in FIGS. 4A and 4B, and they are a vacuum-type helium leak inspection method and a sniffer-type helium leak inspection method.

As shown in FIG. 4A, the vacuum-type method is a method in which an inspection object 1 is accommodated within a vacuum container 2 which has been evacuated with an evacuating pump 3, helium, which is a tracer gas, is sealed in the inspection object 1 under pressure, and helium leaking from the inspection object 1 into the vacuum container 2 is introduced into a detector (a helium detector) for detection making use of the mass analysis of helium. Note that reference numeral 5 denotes an evacuating pump for the detector 4, and reference numeral 6 denotes a controller for controlling valves and for gathering data.

However, in the event that a minute leak must be detected at high speed and with high accuracy using this method, the detector 4 must be connected to the vacuum container 2 for detection after the inspection object 1 is installed in the vacuum container 2 and the periphery of the inspection object, that is, the interior of the vacuum container 2, is made a vacuum. In addition, the interior of the vacuum container 2 has to be finished so that the interior surface of the vacuum container 2 can provide little profile irregularity in order to reduce a risk of the adsorption of helium to a lowest level.

In addition, in the event that an object is inspected with this method which is large in size and complicated in configuration, the vacuum container 2 also needs to be enlarged, this leading to a problem that a tremendous amount of labor and cost is involved in maintaining its required durability and low profile irregularity. In addition, in order to reduce the inspection time, a vacuum needs to be drawn within the vacuum container 2 having a large capacity within as short a period of time as possible, which in turn requires a high-performance evacuating pump for creating the vacuum, resulting in the problem of the production costs being increased further.

Furthermore, there exists a further problem with the utilization of this vacuum-type method that the shape of the inspection object 1 is limited to those which can be installed in the vacuum container 2.

On the other hand, the sniffer-type helium leak detecting method, which is the other prior art method, is a method in which an inspection object 1, in which helium is sealed under pressure, is left exposed to the atmosphere, and a sniffer probe 7 connected to a detector (a helium leak detector) 4' is brought into abutment with the external surface of the inspection object 1 to be traversed around the surface for detecting a leakage of helium gas from the interior of the inspection object. Note that reference numeral 5' denotes an evacuating pump for evacuating the detector 4', and reference numeral 6' denotes an external device for gathering data.

While it is an effective method for detecting leak positions and rough leak amounts of helium gas leaking from the inspection object 1, this sniffer-type method has a problem in that, with this method, it is difficult to realize the quantification of leak amounts and detection with high accuracy.

In addition, in the event that there exist intermediate portions along the length of a path along which the sniffer probe is moved, where walls, pipes and wires are arranged in a complicated fashion, the sniffer probe cannot reach the vicinity of an inspecting position of the inspection object, and therefore, an accurate inspection is not possible. There is known a leak detector which is disclosed in Japanese Unexamined Patent Publication (Kokai) No. 2001-228045 as a solution to the aforesaid problem. In this leak detector, a sniffer probe inlet port is designed to be detachably attached to a position near an inspecting location of an inspection object using an attaching means. Even with this apparatus, however, although the position where a leak occurs can be identified relatively accurately, the quantification of leak amount and highly accurate detection cannot be attained.

SUMMARY OF THE INVENTION

The present invention was made in view of the above problems, and an object thereof is to realize the following at one time:

(1) To reduce inspection costs for inspecting a small-sized inspection object or a limited inspection area of even a relatively large-sized inspection object for a minute airtightness failure;

(2) To enable the inspection of a relatively large-sized or complicatedly shaped inspection object in the atmosphere without installing the entirety of the inspection object;

(3) To realize the quantification of a leak and the detection of leak with high accuracy even in the atmosphere, which is not possible with the prior art sniffer-type helium detector; and (4) To relax the restrictions on inspection objects in inspecting for airtightness failure.

According to an aspect of the invention, there is provided a method, for inspecting for airtightness failure, comprising an initial step of generating an independent constant flow of gas in a cover formed in such a manner as to surround an inspecting area of an inspection object and a detector, respectively, a pre-inspection step of sealing a tracer gas in the inspection object under pressure and placing the cover over the inspecting area, a measuring step of introducing a gas including the tracer gas leaking from the inspection object and drawn out of the cover into the detector for measuring the amount of a leak, and a cleaning step of cleaning flow paths constituting flow path systems of the gas and instruments including the detector after the measuring. This enables the inspection of an inspection object in the atmosphere without installing the entirety of the inspection object in a vacuum container and the realization of quantification of the amount of a leakage and detection of a leakage with high accuracy.

According to another aspect of the invention, there is provided a method, as set forth in the initial aspect of the invention, wherein the constant flow of gas flowing in the cover and the other constant flow of gas flowing in the detector at the initial step are adjusted so as to have the same flow rate. This enables further the realization of quantification of the amount of a leakage and detection of a leakage with high accuracy.

According to a further aspect of the invention, there is provided a method as set forth in the initial aspect of the invention, wherein the cleaning step of cleaning the flow paths constituting the flow path system of the gas and the instruments including the detector includes three modes, whereby the entirety of the flow paths and the device can be cleaned up completely so that no tracer gas is allowed to remain in the cover, the flow paths and the instruments including the detector, thereby enabling measurement with high accuracy.

According to an aspect of the invention, there is provided a method as set forth in the initial aspect of the invention wherein, in case the constituent of the tracer gas exists in the atmosphere, the measurement is implemented by calculating of a difference between an output when there occurs no leakage and an output when there occurs a leakage. This reduces the influence of a change in the amount of the constituent in the atmosphere.

An airtightness failure detector according to the invention is an apparatus for carrying out the airtightness failure detecting method according to the initial aspect of the invention and has first and second gas flow path systems, a test flow path system and a cleaning flow path system.

The present invention may be more fully understood from the description of preferred embodiments of the invention, as set forth below, together with the accompanying drawings.

DESCRIPTION OF THE PREFERRED EMBODIMENTS

Figure 1:
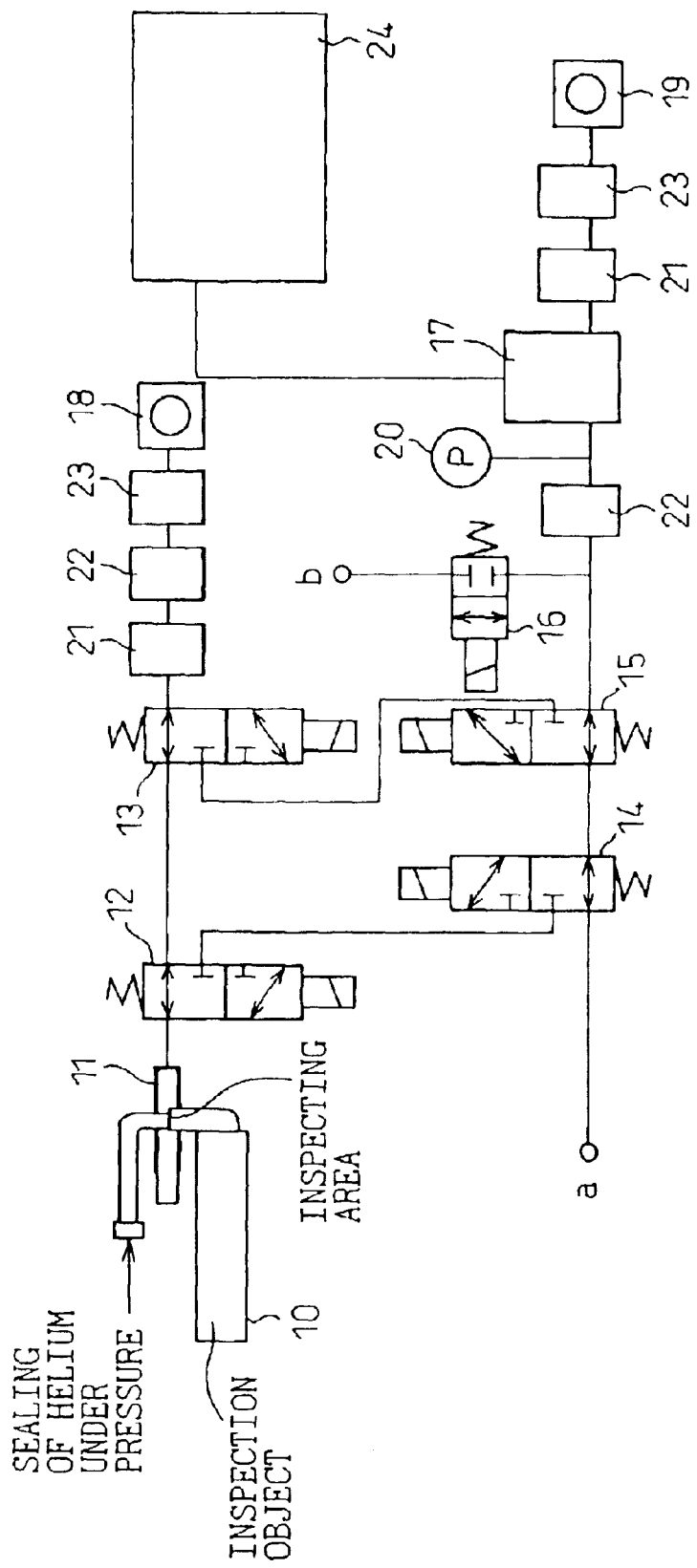
FIG. 1 is a diagram showing the overall construction of an airtightness failure detector according to an embodiment of the present invention which shows flow path systems in an initial state (a first mode)

An apparatus and method for inspecting for airtightness failure according to the present invention will be described below based upon the accompanying drawings. FIG. 1 is a diagram showing the overall construction of an airtightness failure detector according to the present invention. The airtightness failure detector of the invention is constituted by a cover 11 which surrounds an inspecting area of an inspection object 10, a plurality of first to fifth valves 12 to 16 for controlling the switching of flow paths of gas, a helium detecting device (a helium detector) 17 for analyzing the mass of helium that has leaked from the inspection object 10, two, first and second, evacuating pumps 18, 19 for generating a flow of gas in the respective flow paths, a pressure meter 20 and flowmeters 21 for managing the flows of gas within the flow paths and pressure controllers 22 and rate controllers 23 for controlling the state of flows based on outputs from the pressure meter 20 and the flowmeters 21, a vacuum device (not shown) and a pressurizing device (not shown) for sealing a tracer gas (helium) in the inspection object 10 under pressure after a vacuum is made in the interior of the inspection object 10 and a controller 24 for controlling a series of operations of the entirety of the inspecting apparatus and processing data.

The cover 11 can surround the entirety of the inspection object 10 if the object is small or only an inspecting area of the inspection object 10 if the object is large, and the cover 11 is connected to the detector 17 at one end and is opened to the atmosphere at the other end thereof. Consequently, the tracer gas that has leaked from the inspection object 10 is prevented from escaping to thereby be introduced into the detector 17 by allowing air to flow into the interior of the cover 11.

In the inspecting apparatus of the present invention, such flow path systems can be established by appropriately switching the first to fifth valves 12 to 16 as a test flow path system for introducing the tracer gas that has leaked from the inspection object 10 from the cover 11 to the helium detector 17, two, first and second, initial flow path systems for producing a constant flow of atmosphere within the cover 11 and a similar constant flow of atmosphere within the helium detector 17 and a cleaning flow path for cleaning up the interior of the equipment and the flow paths.

Figure 3:
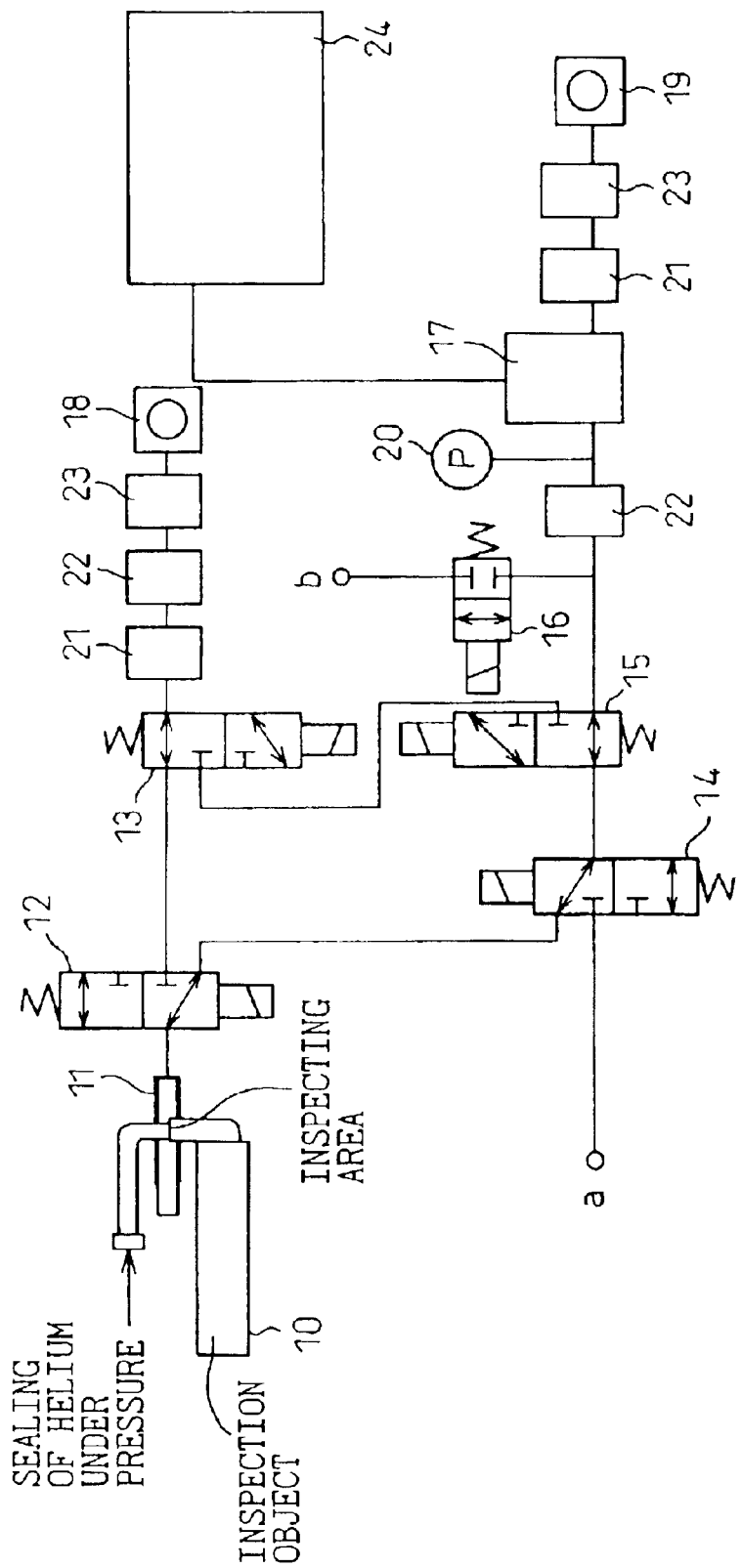
FIG. 3 is a diagram showing flow path systems of a third mode (at the time of measuring) of the airtightness failure detector of the invention.
Figure 4A:
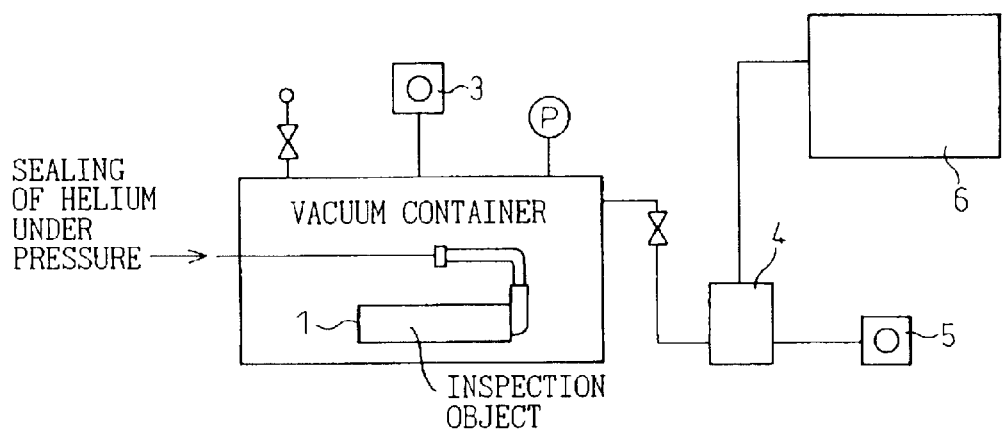
FIG. 4A is an explanatory diagram showing a prior art vacuum-type helium leak inspection method.
Figure 4B:
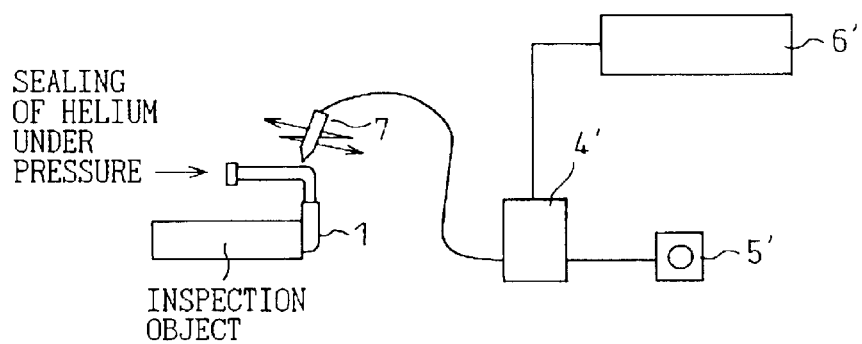
FIG. 4B is an explanatory diagram showing a prior art sniffer-type helium leak inspection method.

Namely, the test flow path system constitutes a flow path initiating from the inspection object 10 and ending up at the second evacuating pump 19 via the first valve 12, the third valve 14, the fourth valve 15, the pressure controller 22, the helium detector 17, the flowmeter 21, and the rate controller 23, as shown in FIG. 3. In addition, the first initial flow path system constitutes a flow path initiating from the cover 11 and ending up at the first evacuating pump 18 via the first valve 12, the second valve 13, the flowmeter 21, the pressure controller 22, and the rate controller 23, as shown in FIG. 1, and the second initial flow path system constitutes a flow path initiating from an atmosphere inlet port (a) and ending up at the second evacuating pump 19 via the third valve 14, the fourth valve 15, the pressure controller 22, the helium detector 17, the flowmeter 21, and the rate controller 23. Furthermore, the cleaning flow path system is constituted by first to third modes which will be described in detail below.

The operation of the inspecting apparatus according to the invention will be described below.

Firstly, in an initial state of the inspecting apparatus, the first to fifth valves 12 to 16 are in the states shown in FIG. 1 and gas drawn in from the cover 11 is evacuated from the first evacuating pump 18 via the first valve 12 and the second valve 13. On the other hand, the atmosphere drawn in from the atmosphere inlet port (a) by the second evacuating pump 19 passes through the third valve 14 and the fourth valve 15 and is then evacuated from the second evacuating pump 19 via the helium detector 17. The flowmeter 21 is provided upstream of the first and second evacuating pumps 18, 19, respectively, for adjusting the flows of gas flowing through the two, first and second, initial flow path systems so that the flow rates of the two flow path systems become the same. The preliminary production of constant flows in the initial state enables the realization of a highly-accurate, high-speed inspection.

The tracer gas is sealed in the interior of the inspection object under pressure and the cover 11 is placed so as to surround an inspection area of the inspection object 10 before an inspection is initiated.

When measuring an amount of the tracer gas that has leaked from the inspection object 10, the first valve 12 and the third valve 14 are operated to be switched over from the states shown in FIG. 1 to those shown in FIG. 3 so as to establish the test flow path system, and gas drawn in from the cover 11 flows through a path initiating from the first valve 12 and ending up at the second evacuating pump 19 via the third valve 14, the fourth valve 15, and the helium detector 17. As this occurs, if the tracer gas (helium) has not yet been sealed in the inspection object 10, an amount of helium existing in the atmosphere in the surrounding environment is to be measured, whereas in case the tracer gas has already been sealed in the inspection object 10 under pressure, a total amount of helium existing in the atmosphere and helium that has leaked from the inspection object 10 is to be measured. The flow rate of gas is adjusted so as to be identical to that in the initial state as this occurs.

There are three modes for cleaning up the interior of the equipment and the flow paths after a measurement is completed.

Firstly, in a first mode for establishing a cleaning flow path, the first to fifth valves 12 to 16 are restored to the initial states (the states illustrated in FIG. 1) and helium remaining in the interior of the flow path initiating from the cover 11 and ending up at the first evacuating pump 18 via the first valve 12 and the second valve 13 and the cover 11 is removed and is replaced with air. At the same time, helium, which is the tracer gas, is depressurized so as to be recovered from the inspection object 10. Furthermore, helium remaining in the interior of the flow path initiating from the atmosphere inlet port (a) and ending up at the second evacuating pump 19 via the third valve 14, the fourth valve 15 and the helium detector 17 and an analyzing pipe in the detector 17 is removed and is replaced with air.

Figure 2:
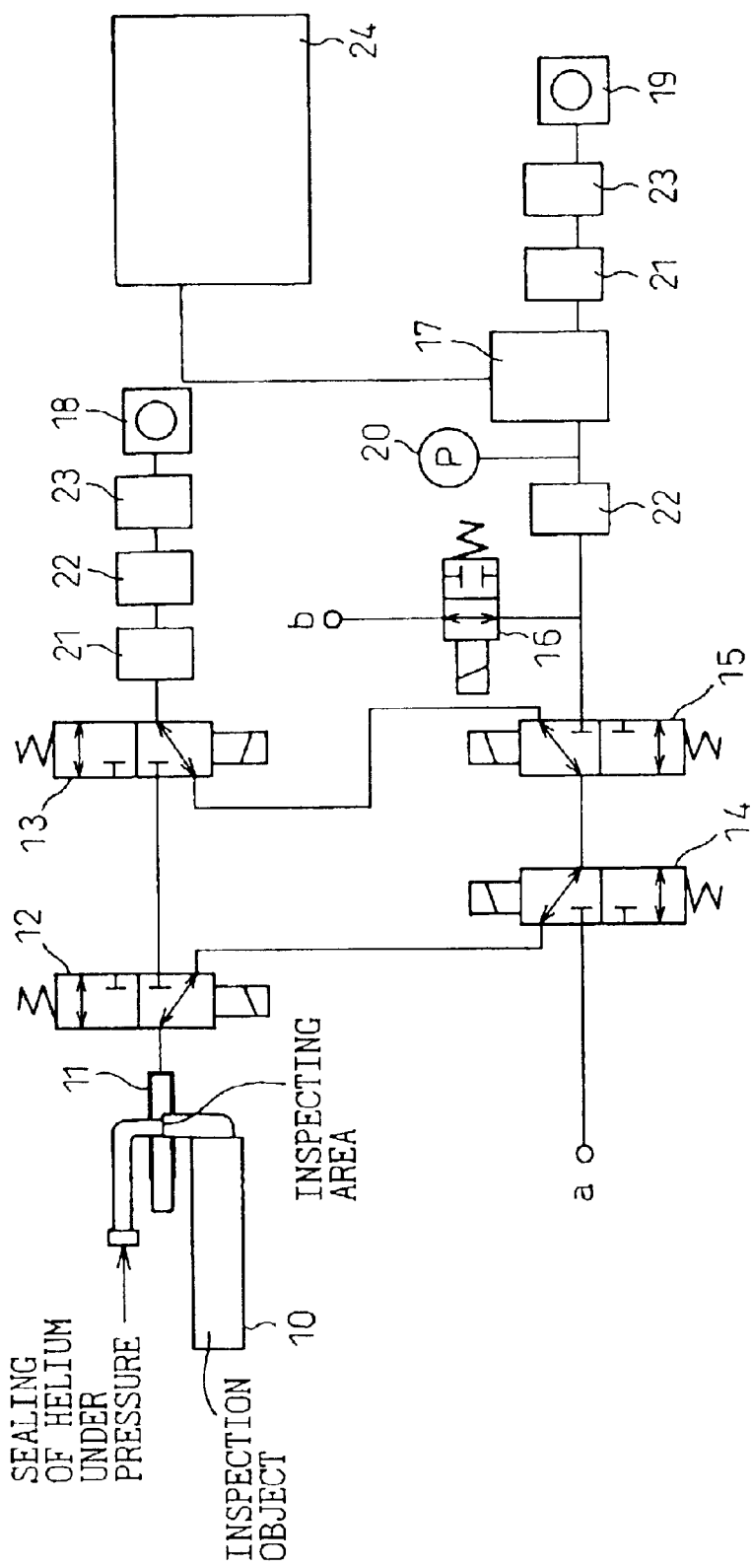
FIG. 2 is a diagram showing flow path systems of a second mode of the airtightness failure detector of the invention.

In a second mode for establishing a cleaning flow path, the first to fourth valves 12, 13, 14, 15 are switched over from the states illustrated in FIG. 1 to those illustrated in FIG. 2 so as to produce a flow initiating from the cover 11 and ending up at the first evacuating pump 18 via the first valve 12, the third valve 14, the fourth valve 15 and the second valve 13, and helium remaining in the interior of the flow path between the first and third valves 12, 14 and the flow path between the third and fourth valves 14, 15 is removed and is replaced with air. In addition, at the same time as this occurs, the fifth valve 16 is switched over from the state shown in FIG. 1 to that shown in FIG. 2 so as to produce a flow initiating from a atmosphere inlet port (b) and ending up at the second evacuating pump 19 via the fifth valve 16 and the helium detector 17, so that helium remaining in the interior of the helium detector 17 continues to be removed and helium adsorbed to the interior of the fourth valve 15 and the flow path is prevented from being drawn out by allowing the flow path to be shut off and also allowing a vacuum to appear in the flow path between the fourth valve 15 and the helium detector 17.

In a third mode where, as at the time of measuring, only the first valve 12 and the third valve 14 are switched over from the states shown in FIG. 1 to those shown in FIG. 3, thereby removing helium remaining between the fourth valve 14 and the helium detector 17. However, as there is a risk that helium is re-introduced into the interior of the analyzing tube of the detector 17 as helium is so removed, the operations from the first mode to the third mode are repeated several times for restoring the inspecting apparatus.

The output from the detector 17 is monitored at a data processing unit in the controller 24 as required for calculating an amount of helium that leaked from the inspection object from a value of the amount of helium existing in the atmosphere and a value of the total amount of helium existing in the atmosphere and helium that has leaked from the inspection object, monitoring the surrounding environment from a value of the amount of helium existing in the atmosphere or monitoring the clean status of the detector.

Note that, while the embodiment has been described as helium being used as the tracer gas, not only helium but also carbon dioxide and methane can be used as the tracer gas. In addition, not only the helium detector which adopts the mass analysis but also other types of detectors can be used as the detecting device. Namely, another combination of a gas and a detector can be used such as a combination of methane or carbon dioxide used as the tracer gas and a detector for detecting the absorption of laser light.

Thus, as has been described heretofore, according to the present invention, when inspecting the small-sized inspection object or the limited inspecting area of even the large-sized inspection object, as the inspection object can be inspected under the atmosphere without installing the entirety of the inspection object in the vacuum container, the inspection cost can be reduced.

In addition, according to the invention which is different from the prior art sniffer-type helium detector, in carrying out an inspection under the atmosphere, as the inspecting apparatus is constructed such that the constant flow of gas is produced in the cover via the different flow path system from the test flow path system ahead of an inspection and the constant flow of gas so produced can be introduced into the detector when the inspection is carried out, and is also constructed such that excessive tracer gas resulting before and after an inspection is prevented from remaining in the interior of the cover and the flow paths, the quantification of a leak amount of tracer gas and detection of such a tracer gas with high accuracy can be made possible to thereby stabilize the inspection, this stabilizing, in turn, the quality of products.

In addition, in the event that the constituent of the tracer gas exists in the atmosphere, the influence of a change in the amount of the constituent in the atmosphere can be reduced by investigating a difference between an output when there occurs no leakage and an output when there occurs a leakage every time an inspection is carried out.

While the invention has been described by reference to the specific embodiment chosen for purposes of illustration, it should be apparent that numerous modifications could be made thereto by those skilled in the art without departing from the basic concept and scope of the invention.

What is claimed is:

1. An airtightness failure inspection method for inspecting the leakage of a tracer gas from an inspection object in which said tracer gas is sealed under pressure, said method comprising:

(1) an initial step of establishing a first flow path system for generating a constant flow of gas by a first evacuating pump in a cover, which is formed in such a manner as to surround an inspecting area of said inspection object and which is opened to the atmosphere at one end and is connected to a flow path at the other end thereof, and a second flow path system for generating a constant flow of gas which is independent from said first flow path system and which draws in the atmosphere from an atmosphere inlet port and discharges said atmosphere so drawn in from a second evacuating pump via a detector;

(2) a pre-inspection step of sealing a tracer gas in said inspection object under pressure and placing said cover over an inspecting area of said inspection object;

(3) a measuring step of switching a flow path system to a flow path system for introducing a gas including said tracer gas that has leaked from said inspecting area and which is drawn out of said cover by said second evacuating pump into said detector for measuring the amount of said leak from said inspecting area at the time of measuring the amount of a leak; and (4) a cleaning step of cleaning up flow paths constituting said flow path systems of said gas and instruments including said detector after said measuring is completed.

2. An airtightness failure inspection method as set forth in claim 1, wherein the flow rates of gas flowing through said first flow path system and said second flow path system are adjusted so as to become the same at said initial step.

3. An airtightness failure inspection method as set forth in claim 1, wherein said cleaning step includes three modes comprising a first mode for establishing said two independent or said first and said second flow path systems and cleaning up flow paths constituting said respective flow path systems and instruments including said detector, a second mode for establishing a flow path system for cleaning up part of said flow paths system and said instruments including said detector by said first evacuating pump at the time of measuring and a flow path system which is independent from said cleaning flow path system and is adapted to clean up said detector by drawing in the atmosphere from another atmosphere inlet port by said second evacuating pump, and a third mode for cleaning up the remaining flow paths.

4. An airtightness failure inspection method as set forth in claim 1 wherein, if the constituent of said tracer gas exists in the atmosphere, said measuring step implements a measurement by calculating a difference between an output of said detector when there occurs no leakage and an output of said detector when there occurs a leakage.

5. An airtightness failure inspecting apparatus for implementing said airtightness failure inspection method as set forth in claim 1, said apparatus comprising first and second flow path systems, a test flow path system and a cleaning flow path system.

* * * * *